United States Patent
Reisgies et al.

(10) Patent No.: US 9,123,041 B2
(45) Date of Patent: *Sep. 1, 2015

(54) SYSTEM AND METHOD FOR PRESENTATION OF MULTIPLE NFC CREDENTIALS DURING A SINGLE NFC TRANSACTION

(71) Applicant: Sequent Software Inc., Mountain View, CA (US)

(72) Inventors: Hans Reisgies, San Jose, CA (US); David Brudnicki, Duvall, WA (US); Andrew Weinstein, San Francisco, CA (US)

(73) Assignee: Sequent Software, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/462,011

(22) Filed: Aug. 18, 2014

(65) Prior Publication Data

US 2014/0358797 A1    Dec. 4, 2014

Related U.S. Application Data

(63) Continuation of application No. 13/284,863, filed on Oct. 28, 2011, now Pat. No. 8,811,895.

(51) Int. Cl.
*H04B 5/00* (2006.01)
*G06Q 20/38* (2012.01)
*H04L 29/06* (2006.01)
(Continued)

(52) U.S. Cl.
CPC ........ *G06Q 20/3821* (2013.01); *G06Q 20/3278* (2013.01); *G06Q 20/401* (2013.01); *H04B 5/0031* (2013.01); *H04L 63/08* (2013.01); *H04L 63/105* (2013.01); *G06Q 2220/00* (2013.01); *H04B 5/0062* (2013.01)

(58) Field of Classification Search
CPC ... H04W 4/008; H04B 5/0031; H04B 5/0075; H04M 1/7253
USPC ................................................. 455/41.1, 41.2
See application file for complete search history.

(56) References Cited

U.S. PATENT DOCUMENTS 7,376,583 B1    5/2008 Rolf
7,802,719 B2    9/2010 Johnson et al.
(Continued)

OTHER PUBLICATIONS

Globalplatform, Advancing Standards for Smart Card Growth, "GlobalPlatform Card Specification Version 2.1", Jun. 4, 2001, pp. 1-222, Copyright 2001 GlobalPlatform Inc.
(Continued)

*Primary Examiner* — Andrew Wendell
*Assistant Examiner* — Maryam Soltanzadeh
(74) *Attorney, Agent, or Firm* — Dunlap Codding, P.C.

(57) ABSTRACT

A system for presentation of multiple NFC credentials via an NFC baseband in a portable communication device during a single NFC transaction. The system comprises a secure element having a directory of available NFC credentials stored therein, wherein the ordering of the available NFC credentials usually indicates the priority. The system further comprises a pre-determined multiple-credential start Application ID (AID) wherein the directory includes a plurality of NFC credentials after the pre-determined multiple-credential start AID. A method for presenting multiple NFC credentials during a single NFC transaction is also disclosed.

20 Claims, 4 Drawing Sheets (51) Int. Cl.
*G06Q 20/32* (2012.01)
*G06Q 20/40* (2012.01)

(56) References Cited

U.S. PATENT DOCUMENTS

| | | | |
|---|---|---|---|
| 8,016,192 B2 | 9/2011 | Messerges et al. | |
| 8,332,272 B2 * | 12/2012 | Fisher | 705/16 |
| 8,639,629 B1 * | 1/2014 | Hoffman | 705/67 |
| 8,666,437 B2 * | 3/2014 | Stromberg et al. | 455/466 |
| 8,667,285 B2 * | 3/2014 | Coulier et al. | 713/171 |
| 8,700,729 B2 * | 4/2014 | Dua | 709/217 |
| 2004/0068472 A1 | 4/2004 | Sahota et al. | |
| 2005/0246098 A1 | 11/2005 | Bergstrom et al. | |
| 2007/0123305 A1 | 5/2007 | Chen et al. | |
| 2007/0254712 A1 | 11/2007 | Chitti | |
| 2008/0078831 A1 | 4/2008 | Johnson et al. | |
| 2008/0162312 A1 | 7/2008 | Sklovsky et al. | |
| 2008/0162353 A1 | 7/2008 | Tom et al. | |
| 2008/0167017 A1 | 7/2008 | Wentker et al. | |
| 2008/0167944 A1 | 7/2008 | Keithley et al. | |
| 2009/0050688 A1 | 2/2009 | Kon et al. | |
| 2009/0064346 A1 | 3/2009 | Larsson et al. | |
| 2009/0215394 A1 | 8/2009 | Dewan | |
| 2009/0267867 A1 | 10/2009 | Gonia | |
| 2010/0024017 A1 | 1/2010 | Ashfield et al. | |
| 2010/0117794 A1 | 5/2010 | Adams et al. | |
| 2010/0201516 A1 | 8/2010 | Gelvin et al. | |
| 2011/0078081 A1 | 3/2011 | Pirzadeh et al. | |
| 2011/0130095 A1 | 6/2011 | Naniyat et al. | |
| 2012/0016696 A1 | 1/2012 | Lee | |
| 2012/0084177 A1 | 4/2012 | Tanaka et al. | |
| 2012/0095852 A1 | 4/2012 | Bauer et al. | |
| 2012/0124394 A1 | 5/2012 | Brudnicki et al. | |
| 2012/0124658 A1 | 5/2012 | Brudnicki et al. | |
| 2012/0124659 A1 | 5/2012 | Craft et al. | |
| 2012/0143706 A1 | 6/2012 | Crake et al. | |
| 2012/0266220 A1 | 10/2012 | Brudnicki et al. | |
| 2013/0024223 A1 | 1/2013 | Thomas | |
| 2013/0054470 A1 | 2/2013 | Campos et al. | |

OTHER PUBLICATIONS

Globalplatform, Advancing Standards for Smart Card Growth, "GlobalPlatform Card Specification Version 2.1.1", Mar. 25, 2003, pp. 1-237, Copyright 2003 GlobalPlatform Inc.

Globalplatform, Advancing Standards for Smart Card Growth, "GlobalPlatform Card Specification 2.1.1 Amendment A", Mar. 2004, pp. 1-10, Copyright 2004 GlobalPlatform Inc.

Globalplatform, The Standard for Smart Card Infrastructure, "GlobalPlatform Card Specification Version 2.2", Mar. 2006, pp. 1-375, Copyright 2006 GlobalPlatform Inc.

Globalplatform, The Standard for Managing Applications on Secure Chip Technology, "GlobalPlatform Card Specification, Version 2.2.1 Public Release", Jan. 2011, pp. 1-303, Copyright 2006-2011 GlobalPlatform Inc.

Globalplatform, The Standard for Managing Applications on Secure Chip Technology, "GlobalPlatform Card Confidential Card Content Management Card Specification v2.2—Amendment A, Version 1.0.1 Public Release", Jan. 2011, pp. 1-26, Copyright 2007-2011 GlobalPlatform Inc.

International Searching Authority, "Search Report and Written Opinion", issued in connection with International Application No. PCT/US11/61052, mailed on Mar. 6, 2012, 8 pages.

International Searching Authority, "Search Report and Written Opinion", issued in connection with International Application No. PCT/US12/62443, mailed on Jan. 31, 2013, 6 pages.

\* cited by examiner

SYSTEM AND METHOD FOR PRESENTATION OF MULTIPLE NFC CREDENTIALS DURING A SINGLE NFC TRANSACTION

CROSS REFERENCE TO RELATED APPLICATIONS

This application is a continuation of U.S. application Ser. No. 13/284,863, filed on Oct. 28, 2011, entitled "System and Method for Presentation of Multiple NFC Credentials During A Single NFC Transaction." The content of which is incorporated herein by reference in its entirety.

TECHNICAL FIELD

The present invention relates generally to the use of secure data to complete a wireless transaction, and more particularly to a system and method for presentation of multiple NFC credentials during a single NFC transaction.

BACKGROUND

Wireless transactions using RFID-based proximity cards are fairly common place. For instance, many workers use RFID keycards to gain access to their workplace and drivers use RFID passes to pay tolls at highway speeds. RFID, which stands for radio-frequency identification, uses electromagnetic waves to exchange data between a terminal and some object for the purpose of identification. More recently, companies have been trying to use RFIDs supported by cellular telephones to implement an electronic payment product (i.e. credit and/or debit card). However, basic RFID technology raises a number of security concerns that have prompted modifications of the basic technology. Still, widespread adoption of RFID as a mechanism for electronic payments has been slow.

Near Field Communication (NFC) is another technology that uses electromagnetic waves to exchange data. NFC waves are only transmitted over a short-range (on the order of a few inches) and at high-frequencies. NFC devices are already being used to make payments at point of sale devices. NFC is an open standard (see, e.g. ISO/IEC 18092) specifying modulation schemes, coding, transfer speeds and RF interface. There has been wider adoption of NFC as a communication platform because it provides better security for financial transactions and access control. Other short distance communication protocols are known and may gain acceptance for use in supporting financial transactions and access control.

Regardless of the wireless communication protocol selected there are bound to be operation errors both within the devices the protocol is implemented on (called "wireless wallets" in the present specification) as well as within communications between the wireless wallet and local host devices (e.g. point of sale terminals, keycard access control terminals), within the local host devices; within any server-side equipment that must interact with the local host devices (e.g. for confirmation or approval); and within communications between the wireless wallet, its mobile network and beyond. For instance, a consumer may have trouble completing a purchase using the "credit card" embedded in his smartphone in a big-box retail store at the point of sale because of one or more problems with (1) the NFC connection between the consumer's phone and the POS; (2) the secure data is corrupt on the consumer's smartphone; (3) the consumer's electronic wallet account has been disabled by the card issuer; (4) the POS device has outdated NFC communication software; etc.

A problem arises in that no single company is presently responsible for coordinating the troubleshooting of failed electronic wallet transactions. As such, our consumer may have a difficult time determining which—if any—of the foregoing potential problems is preventing the desired electronic wallet transaction. Thus, our consumer may stop using the electronic wallet or may not be able to complete a transaction with that particular retailer leading the consumer to try to consummate a similar transaction at a competitor.

One problem that may prevent successful completion of a transaction is due the myriad of communications protocols associated with the various different point of sale terminals available. So, for instance, the protocol necessary to successfully communicate wirelessly with an IBM point of sale terminal may be very different from the protocol necessary to communication with an NCR terminal. Accordingly, it is an object of the present invention to provide a system and method for using geo-location data (where available) to try to predetermine the likely point of sale terminal device present in the retail establishment co-located with the portable communication device.

Accordingly, the present invention seeks to provide one or more solutions to the foregoing problems and related problems as would be understood by those of ordinary skill in the art having the present specification before them. These and other objects and advantages of the present disclosure will be apparent to those of ordinary skill in the art having the present drawings, specifications, and claims before them. It is intended that all such additional systems, methods, features, and advantages be included within this description, be within the scope of the disclosure, and be protected by the accompanying claims.

BRIEF DESCRIPTION OF THE DRAWINGS

For a better understanding of the present disclosure, non-limiting and non-exhaustive embodiments are described in reference to the following drawings. In the drawings, like reference numerals refer to like parts through all the various figures unless otherwise specified.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Portable Communication Devices

The present invention provides a system and method that can be utilized with a variety of different portable communication devices 50, including but not limited to PDA's, cellular phones, smart phones, laptops, tablet computers, and other mobile devices that include cellular voice and data service as well as preferable access to consumer downloadable applications. One such portable communication device could be an iPhone, Motorola RAZR or DROID; however, the present invention is preferably platform and device independent. For example, the portable communication device technology platform may be Microsoft Windows Mobile, Microsoft Windows Phone 7, Palm OS, RIM Blackberry OS, Apple OS, Android OS, Symbian, Java or any other technology platform. For purposes of this disclosure, the present invention has been generally described in accordance with features and interfaces that are optimized for a smart phone utilizing a generalized platform, although one skilled in the art would understand that all such features and interfaces may also be used and adapted for any other platform and/or device.

Figure 1:
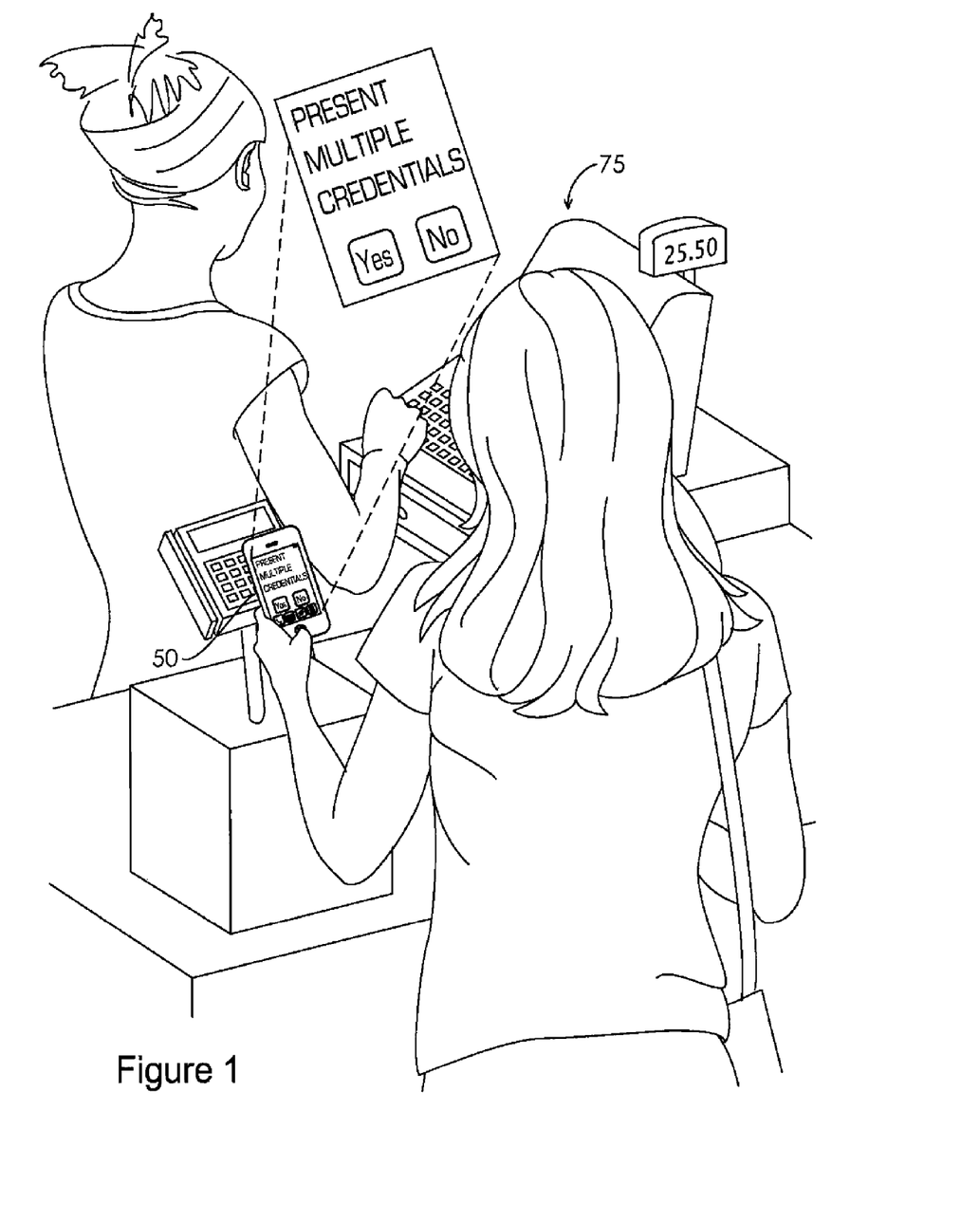
FIG. 1 illustrates an agent installed in the end user's portable communication device asking whether she would like to present multiple credentials at a point of sale.

The portable communication device 50 includes one or more short proximity electromagnetic communication devices, such as an NFC, RFID, or Bluetooth transceiver. It is presently preferred to use an NFC baseband that is Compliant with NFC IP 1 standards (www.nfcforum.org), which provides standard functions like peer-to-peer data exchange, reader-writer mode (i.e. harvesting of information from RFID tags), and contactless card emulation (per the NFC IP 1 and ISO 14443 standards) when paired with a secure element 120 on the portable communication device 50 and presented in front of a "contactless payment reader" (as depicted in FIG. 1). As would be understood in the art by those having the present specification, figures, and claims before them, the NFC IP 1 standards are simply the presently preferred example, which could be exported—in whole or in part—for use in association with any other proximity communication standard. It is further preferred that the portable communication device include an NFC/RFID antenna (conformed to NFC IP 1 and ISO 14443 standards) to enable near field communications. However, as would be understood in the art NFC/RFID communications may be accomplished albeit over even shorter ranges and potential read problems.

The portable communication device 50 also includes a mobile network interface to establish and manage wireless communications with a mobile network operator. The mobile network interface uses one or more communication protocols and technologies including, but not limited to, global system for mobile communication (GSM), 3G, 4G, code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols to communicate with the mobile network of a mobile network operator. Accordingly, the mobile network interface may include as a transceiver, transceiving device, or network interface card (NIC). It is contemplated that the mobile network interface and short proximity electromagnetic communication device could share a transceiver or transceiving device, as would be understood in the art by those having the present specification, figures, and claims before them.

The portable communication device 50 further includes a user interface that provides some means for the consumer to receive information as well as to input information or otherwise respond to the received information. As is presently understood (without intending to limit the present disclosure thereto) this user interface may include a microphone, an audio speaker, a haptic interface, a graphical display, and a keypad, keyboard, pointing device and/or touch screen. As would be understood in the art by those having the present specification, figures, and claims before them, the portable communication device 50 may further include a location transceiver that can determine the physical coordinates of device on the surface of the Earth typically as a function of its latitude, longitude and altitude. This location transceiver preferably uses GPS technology, so it may be referred to herein as a GPS transceiver; however, it should be understood that the location transceiver can additionally (or alternatively) employ other geo-positioning mechanisms, including, but not limited to, triangulation, assisted GPS (AGPS), E-OTD, OTD, CI, SAI, ETA, BSS or the like, to determine the physical location of the portable communication device on the surface of the Earth.

The portable communication device 50 will also include a microprocessor and mass memory. The mass memory may include ROM, RAM as well as one or more removable memory cards. The mass memory provides storage for computer readable instructions and other data, including a basic input/output system ("BIOS") and an operating system for controlling the operation of the portable communication device. The portable communication device will also include a device identification memory dedicated to identify the device, such as a SIM card. As is generally understood, SIM cards contain the unique serial number of the device (ESN), an internationally unique number of the mobile user (IMSI), security authentication and ciphering information, temporary information related to the local network, a list of the services the user has access to and two passwords (PIN for usual use and PUK for unlocking). As would be understood in the art by those having the present specification, figures, and claims before them, other information may be maintained in the device identification memory depending upon the type of device, its primary network type, home mobile network operator, etc.

In the present invention each portable communication device 50 is thought to have two subsystems: (1) a "wireless subsystem" that enables communication and other data applications as has become commonplace with users of cellular telephones today, and (2) the "secure transactional subsystem" which may also be known as the "payment subsystem". It is contemplated that this secure transactional subsystem will preferably include a Secure Element, similar (if not identical) to that described as part of the Global Platform 2.1.X, 2.2, or 2.2.X (www.globalplatform.org). The secure element 120 has been implemented as a specialized, separate physical memory used for industry common practice of storing payment card track data used with industry common point of sale; additionally, other secure credentials that can be stored in the secure element include employment badge credentials (enterprise access controls), hotel and other card-based access systems and transit credentials.

Mobile Network Operator

Each of the portable communications devices is connected to at least one mobile network operator. The mobile network operator generally provides physical infrastructure that supports the wireless communication services, data applications and the secure transactional subsystem via a plurality of cell towers that communicate with a plurality of portable communication devices within each cell tower's associated cell. In turn, the cell towers may be in operable communication with the logical network of the mobile network operator, POTS, and the Internet to convey the communications and data within the mobile network operator's own logical network as well as to external networks including those of other mobile network operators. The mobile network operators generally provide support for one or more communication protocols and technologies including, but not limited to, global system for mobile communication (GSM), 3G, 4G, code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols to communicate with the portable communication devices.

Retail Subsystem

Standard at merchants today is an Internet Protocol connected payment system that allows for transaction processing of debit, credit, prepay and gift products of banks and merchant service providers. By swiping a magnetic stripe enabled card at the magnetic reader of a Point of Sale Terminal, the card data is transferred to the point of sale equipment and used to confirm funds by the issuing bank. This point of sale equipment has begun to include contactless card readers as accessories that allow for the payment card data to be presented over an RF interface, in lieu of the magnetic reader. The data is transferred to the reader through the RF interface by the ISO 14443 standard and proprietary payment applications like PayPass and Paywave, which transmit the contactless card data from a card and in the future a mobile device that includes a Payment Subsystem.

A retailer's point of sale device 75 (see FIG. 1) may be connected to a network via a wireless or wired connection. This point of sale network may include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, the point of sale network may utilize any communication method that allows information to travel between the point of sale devices and financial services providers for the purpose of validating, authorizing and ultimately capturing financial transactions at the point of sale for payment via the same financial service providers.

Federated Payment Subsystem

Figure 2:
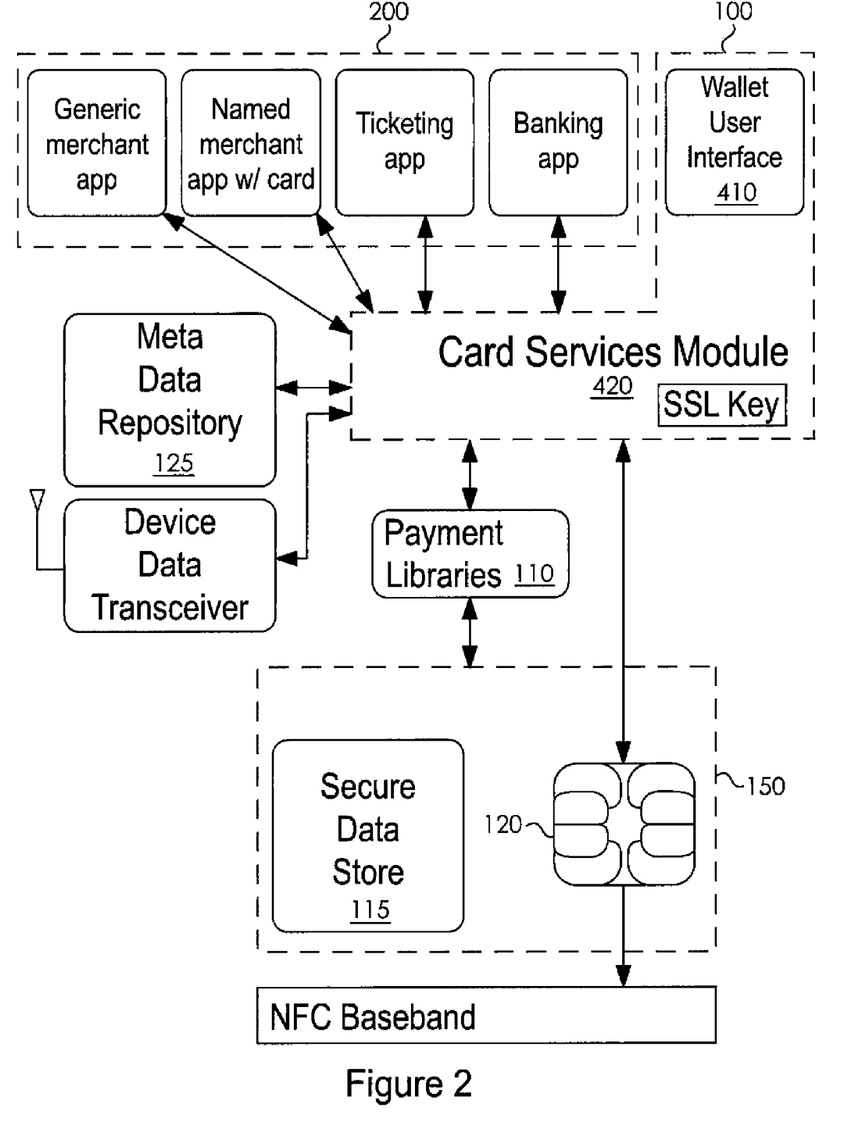
FIG. 2 is a block diagram illustrating the logical blocks within a portable communication device that may be relevant to the present system.

As shown in FIG. 2, each portable communication device 50 may contain one or more third party applications 200 (e.g. selected by the consumer), OpenWallet 100, payment libraries 110, secure element 120, NFC Baseband, and a payment subsystem 150 (i.e. secure data store 115 and secure element 120). OpenWallet 100 is a computer application that allows the consumer to see all credentials (e.g., card, coupon, access control and ticket data) stored in the device 50 (preferably in payment subsystem 150). OpenWallet 100 would also preferably track the issuers of all the credentials stored in the portable communication device's payment subsystem 150 and determine on an application-by-application basis whether that third party application should have permissions to view, select and/or change the credentials stored in the payment subsystem. In this manner, OpenWallet 100 also prevents unauthorized applications from accessing data stored in the payment subsystem 150, which they do not currently have permission to access.

The payment libraries 110 are used by OpenWallet 100 to manage (and perform housekeeping tasks on) the secure element 120, interface with the system management back end, and perform over-the-air (OTA) provisioning via data communication transceiver (including its SMS channel), on the device 50. It is contemplated that the OTA data communications will be encrypted in some manner and an encryption key will be deployed in card service module 420. The payment subsystem 150 may be used to store credentials such as payment card, coupon, access control and ticket data (e.g. transportation, concert). Some of these payment types may be added to the payment subsystem by different applications 200 for use by those applications. In this manner, other third party applications (not shown) may be precluded from accessing the payment subsystem 150.

The secure data store 115 may be included to provide additional secured storage on the portable communication device 50. Various levels of security may be provided depending upon the nature of the data intended for storage in secure data store 115. For instance, secure data store 115 may simply be password-protected at the operating system level of device 50. As is known in these operating systems, the password may be a simple alphanumeric or hexadecimal code that is stored somewhere on the device 50. Alternatively, the data in secure data store 115 is preferably encrypted. More likely, however, the secure data store 115 will be set up as a virtual secure element in the manner disclosed in the co-pending patent application (owned by the assignee of the present application) entitled "System and Method for Providing A Virtual Secure Element on a Portable Communication Device" filed on Oct. 21, 2011 and hereby incorporated by reference.

OpenWallet 100 preferably removes the complexity involved in the storage, maintenance and use of credentials such as card, coupon, ticket, access control data from one or multiple sources or issuers in association with the payment subsystem 150. OpenWallet 100 also preferably enforces access control to the data stored in the payment subsystem 150 and the functions allowed by each application. In one approach, OpenWallet 100 verifies the author/issuer of each third party application stored on the portable communication device 50. This verification may be accomplished by accessing a local authorization database of permitted (i.e., trusted) applications. Under this approach, only applications that are signed with a known Issuer ID and the correctly associated Compile ID are allowed by card services module 420 to access and/or manipulate data stored in the payment subsystem 150 and/or meta data repository 125 (which stores, among other things, card image data and any embossed card data).

In other words, when an application 200 or wallet user interface 410 needs to interact with the payment subsystem 150 it does so by passing a digital identifier (such as its Issuer ID or App ID), a digital token (i.e., Compile ID or Secret Token ID), the desired action, and any associated arguments needed for the action to the card services module 420. Card services module 420 verifies the digital identifier-digital token pair matches trusted application data in the secure data table, and then would issue the one or more commands necessary to execute the desired action. Among the potential actions that may be used by applications 200 or wallet user interface 410 are those associated with:

a. wallet management (e.g. setting, resetting or enabling wallet passcodes; get URL of OTA server; over-the-air registry provisioning; setting payment timing; increasing payment timing; set default card; list issuers, list supported credentials; set display sequence of credentials; set credential storage priority; create categories/folders; associate credentials with categories; memory audit; determine SE for storage of credential; get Offers; update wallet status)
 b. credential management (e.g. add credential; view credential detail; delete credential; activate credential (for redemption/payment); deactivate credential; search credentials; list credential capability; set default credential; lock/unlock credential; require passcode access; get credential image; set access passcode)
 c. Secure Element (SE) Management (e.g. get credential; update credential; update meta data; delete credential; wallet lock/unlock; SE lock/unlock)
 d. Personalization (e.g. add credential; delete credential; suspend/unsuspend credential; notification for issuer metadata update; notification for card metadata update)

The functions of "OpenWallet" 100 can be integrated into a single dedicated module that provides a user interface that is closely coupled to the card services. In another embodiment illustrated in FIG. 4, the capabilities and functionality of OpenWallet 100 may be distributed between a Wallet User Interface 410 and a Card Services Module 420. The distributed approach would allow applications to have direct access to the Card Services Module 420 without having to use the user interface provided by Wallet User Interface 410. The Card Services Module 420 may be configured to track the issuer of all card, coupon, access and ticket data stored in the payment subsystem 150 of the portable communication device 50 and determine on an application-by-application basis whether an application should have permissions to view, select, use and/or change secure data stored in the payment subsystem. The wallet user interface 410 provides a user interface through which a user may register, provision, access and/or use the information securely stored in association with the card services module 420 relating to the user's credentials. Because the wallet user interface 410 is separated from the card services module 420, the user may elect to use one of the third party applications 200 to manage information in the Card Services Module 420. As further shown in FIG. 2, metadata (such as credential logos (e.g. Amtrak®, MasterCard®, TicketMaster®, and Visa®) and affinity images (e.g. AA Advantage® and United Mileage Plus®)) may be stored in memory 125 for use by the third party apps 200 or wallet user interface 410 in rendering a more friendly user experience. As this metadata can be shared across applications, the storage needed to implement secured transaction may be minimized.

Where the secure element 120 has multiple credentials, the desire and even need to present one than one of those credentials in a single transaction is likely to arise. For instance, a user may want to split the cost of a transaction between two credit cards, a credit card and debit card, or the like. In another example, where the secure element also stores coupons or other discount offers the user may desire to use the coupons and then place the remaining balance on a credit card. As would be understood by those having the present specification before them the possible permutations are endless.

The secure element 120 is commonly compliant with the EMVCo specifications. Secure elements that follow EMVCo specifications employ Proximity Payment System Environment (PPSE), where the PPSE is a directory of available credentials currently stored in the secure elements. Each credential stored in such a secure element is assigned an Application ID (AID) (which AID was preferably registered by an ISO/IEC 7816-5 registration authority), and stored in the PPSE. These AIDs are stored in priority order in the PPSE, with the first AID having the highest priority, the second AID having the next lower priority, and so on.

Figure 3:
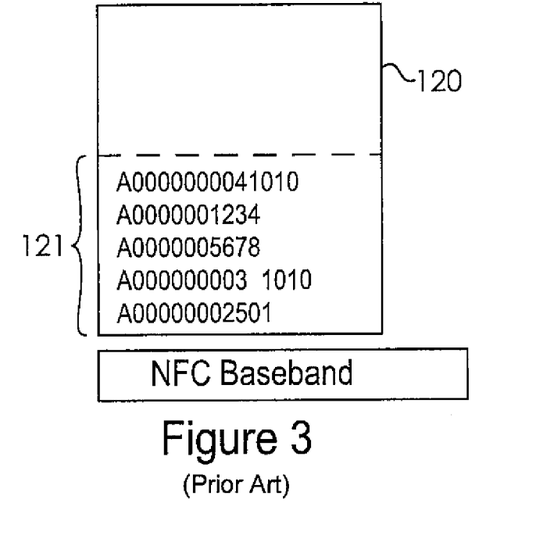
FIG. 3 is a block diagram illustrating the prior art configuration of a Proximity Payment System Environment (PPSE) in a secure element 120 of a portable communication device for standard use with a legacy reader.

When the portable communication device 50 is brought near a contactless reader, the reader examines the first credential in the PPSE. If the contactless reader is capable of reading the first credential, it reads the credential and upon successfully reading that credential generally provides some user-perceivable indication of success (e.g. sounding a pleasant beep and/or illuminating a LED on the reader housing), and then it completes the transaction with the appropriate financial services provider (via the network connected to the retailer's point of sale device 75). If the contactless reader does not recognize the first credential it reads the next subsequent credential in the PPSE until it finds a credential it recognizes. These examples can be illustrated with the credentials depicted in PPSE 121 of FIG. 3. In particular, FIG. 3 depicts an example of a PPSE 121 having a first credential, which for sake of illustration we will refer to as being a MasterCard credit card with the code A0000000041010, a second credential we will call a digital coupon having the code A0000001234, a third credential we will call another digital coupon having the code A0000005678, a fourth credential we will refer to as a Visa credit card having the code A000000003. 1010), and a fifth credential we will call an American Express credit card having the code A00000002501. As would be understood by those skilled in the art having the present specification, drawings, and claims before them, these codes are merely illustrations of the types of codes that may be stored in a PPSE/secure element. Furthermore fewer or additional credentials may be included in a secure element subject—at the upper end—to any size limitations of the selected secure element. In the legacy mode of operation, the arrangement of the PPSE depicted in FIG. 3 would indicate that the wallet was configured to present the MasterCard credit card as the primary credential from the electronic wallet (as it is at the top of the PPSE 121). After examining the PPSE, a contactless reader that supports the MasterCard credential should attempt to accept the MasterCard card credential (i.e. A0000000041010) from the portable communication device 50. According to existing EMVCo specifications, once the attempt to accept the MasterCard credential has completed, the communication between the card and the reader would end. If the reader is not capable of reading the MasterCard credential it will next attempt to read the second credential in the PPSE, which has been illustrated by code A0000001234 and described as being a digital coupon. As few, if any readers have been programmed to accept digital coupons, the reader will likely not accept this credential and continue to "down" the PPSE 121 reading the third credential unsuccessfully until reaching the fourth credential, e.g., A000000003. 1010, which has been described in the present specification as being a VISA credit card credential. In our example the reader would be capable of reading a VISA credential, so this fourth credential in the PPSE would be read successfully, with an indication of success given by the reader, and communication between the secure element 120 and contactless card reader would end.

The foregoing example notwithstanding, in nearly all of the hundreds of millions of smart cards and wallet-enabled portable communication devices in use today, there is only one set of card data inside the secure element and, therefore, only one AID in the PPSE. In this common case, a contactless reader examines the PPSE, finds the sole AID, and then uses that single AID to communicate to the credentials in the smart card. If the sole AID is unrecognized by the particular reader, then the attempted contactless transaction fails.

With a user interface and larger memory sizes, a secure element in a portable communication device could easily be used to store and manage multiple sets of credentials. For instance, these credentials may include multiple credit cards, debit cards as well as digital coupons. New credential types can be programmed into legacy readers in the same way that credit (and debit) cards have previously been programmed into the readers (and associated secure elements). However, merely programming additional credential types into the readers will not be fully useful because readers will still only read the PPSE from "top" to "bottom" until the first recognized credential is successfully read and then communications between the secure element and reader would terminate. And a second, subsequent attempted communication between portable communication device and reader would only result in the reader reading the same credential from the top of the PPSE 121 a second time.

The present system and method further establishes uniquely created AIDs that are defined to instruct legacy card readers to execute advanced functions, such as multiple credential presentation and the provision of digital receipt printing capability via the secure element. By using AIDs to represent instructions instead of just the credentials that AIDs were intended to represent, the PPSE 121 would act as a simple messaging interface between the secure element 120 and a reader. Each legacy reader would be updated to recognize the newly created command AIDs in the same general manner that contactless readers are updated now (e.g. a technician locally downloads a new file to the reader using a USB memory device). Of course, after the introduction of this idea to the mark the contactless card readers will be initially designed/programmed to recognize the command AIDs that will established within the contactless payment industry based on the present invention.

So, for illustration purposes let's assume the contactless reader in FIG. 1 has been reprogrammed to recognize command AIDs as well as the AIDs for various credentials, including, but not limited to, coupons and payment cards. If a user has the desire to submit their MasterCard credential and the two digital coupon credentials to the reader (these credentials having already been described in association with FIG. 3 above), the user would indicate this desire to the device 50. One potential approach has been illustrated in FIG. 1. If the user selects "yes" on the user interface to question about the presentation of multiple credentials, the user interface would offer a listing of the available credentials in the PPSE 121 for the user to select for presentation in the transaction. Based on those selections, the payment libraries 110 in combination with the management applet on the secure element 120 would rearrange the credentials in the PPSE 121 in accordance with the user's selections to facilitate the presentation of two or more NFC credentials in a single transaction. The simplicity of memory management in current secure elements would require the use of one or more memory locations preferably within the secure element and more preferably in the PPSE to swap credentials back and forth to reorder the PPSE.

Figure 4:
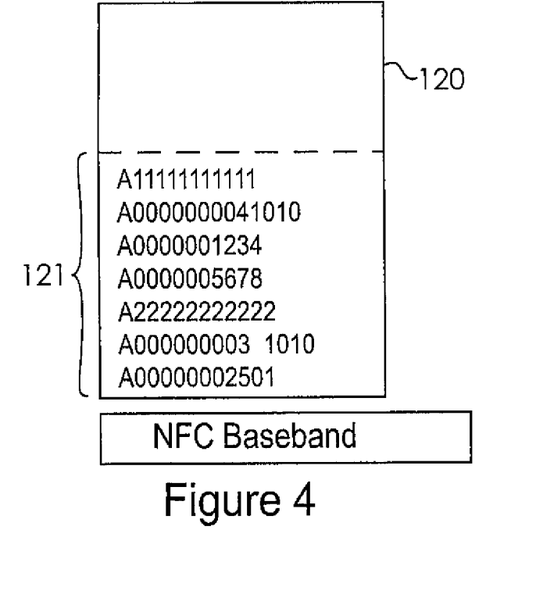
FIGS. 4-6 are block diagrams illustrating various configuration of the Proximity Payment System Environment (PPSE) in the secure element 120 of the portable communication device for use in the present invention.

FIG. 4 depicts an exemplary configuration of the PPSE 121 to facilitate the presentation of multiple credentials in a single NFC transaction. First, FIG. 4 illustrates the addition of a pre-determined multi-credential START-code AID 700 to the PPSE 121. As the name suggests, START-code AID 700 will indicate to updated contactless card readers the beginning of a multiple credential data transmission. As depicted in FIG. 4, multi-credential START-code AID 700 could be assigned a pre-determined code A11111111111. However, as should be understood by those of ordinary skill in the art having the present specification, drawings, and claims before them, any pre-determined constant may be used for this purpose so long as the constant is unique. Most preferably AID 700 should not be the same value as any validly issued credentials. Conversely, whatever constant is selected for the pre-determined multi-credential START-code AID 700 should be reserved for the purposes disclosed herein. FIG. 4 further illustrates a pre-determined multi-credential END-code AID 750 has also been illustrated. As the name suggests, END-code AID 750 will indicate to updated contactless card readers the end of the multiple credential transmission data. As depicted in FIG. 4, AID 750 has been given the constant value A22222222222. Here again, the designers should preselect the value for the pre-determined multi-credential END-code AID 750 to avoid duplicating assigned credential codes and ultimately the selected END-code AID should be reserved for this use. It is contemplated that the pre-determined command AIDs could dynamically altered by the secure element in a preproduceable manner that would also be known to the readers to enhance the security of the command transaction.

As in the prior art, the PPSE 121 still contains credentials. In the example of FIG. 4, because they are presented between the A11111111111 and A22222222222 AID command codes, the MasterCard credential (ending with 010), and two digital coupon credentials (ending in 234 and 678) would be presented to the contactless card reader during the same NFC transaction. To further illustrate the points regarding presentation and reorganization of credentials within the PPSE 121, FIG. 4 depicts two more NFC credentials after the pre-determined END-code AID 750 (A22222222222). These two credentials will not presented to the NFC Baseband during the single transaction because they are loaded in the PPSE 121 after the END AID command. Thus, a reader that supports the new method would recognize the START-code AID 700 indicator (A11111111111) and understand that the user of this secure element 120 has indicated that multiple credentials should be transferred to the reader in the same session. The reader would accept the MasterCard card credential, the digital coupon 1234 credential, the digital coupon 5678 credential. Upon detecting the end AID, the reader would stop attempting to read further credentials and end the session with the secure element This system and method is also backwards compatible with legacy readers that have not been reprogrammed with command AIDs. For instance, with reference to the illustration of FIG. 4, an unupdated reader would try to read START-code AID 700 indicator A11111111111 because it is at the top of the PPSE 121. By definition, this unupdated reader will not recognize this AID credential and then read the next credential in the PPSE 121, which in the example of FIG. 4 is the MasterCard credential (ending with 010). The reader would recognize the MasterCard credential and just as illustrated in the example of FIG. 3 execute on the MasterCard credential. To further support this backward compatibility, the user interface may force the user to list multiple credentials for presentation by the probability that a reader will recognize the credential. For instance, credit card NFC credentials have long been known in this art, so they would be forced to the top of any user selection of multiple credentials.

Figure 5:
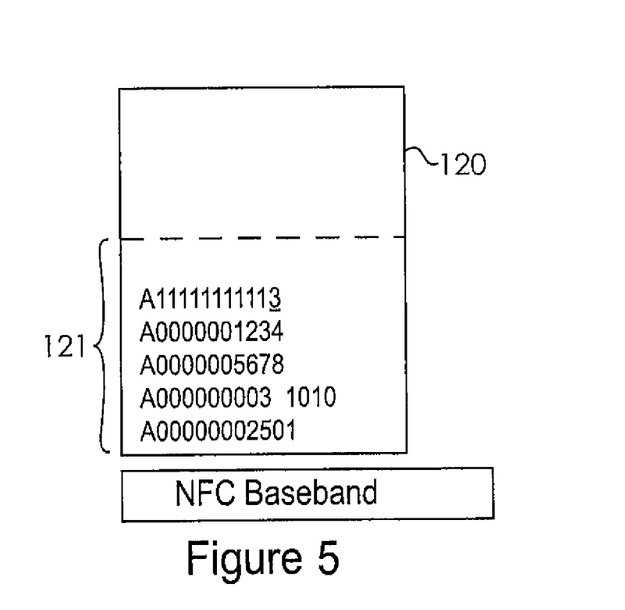

An alternative approach is illustrated in FIG. 5. Here only a START-code AID constant is used. This "constant" has a final digit that is varied to reflect the number of credentials that reader should expect to be presented during the single transaction. As illustrated, the pre-determined multi-credential start word has been slightly modified to indicate that three credentials are intended for transfer (e.g. A11111111113). (The underlining is merely for emphasis and would not actually occur in the PPSE.) So, the reader would be programmed to expect three credentials during the single transaction, and thus will run its read-accept cycle three times traveling down the PPSE 121. The result will be the reader receiving the credentials A0000001234 (a digital coupon), A000005678 (another digital coupon) and A000000003 1010 (a Visa card credential) in three separate reads of the single NFC transaction.

Figure 6:
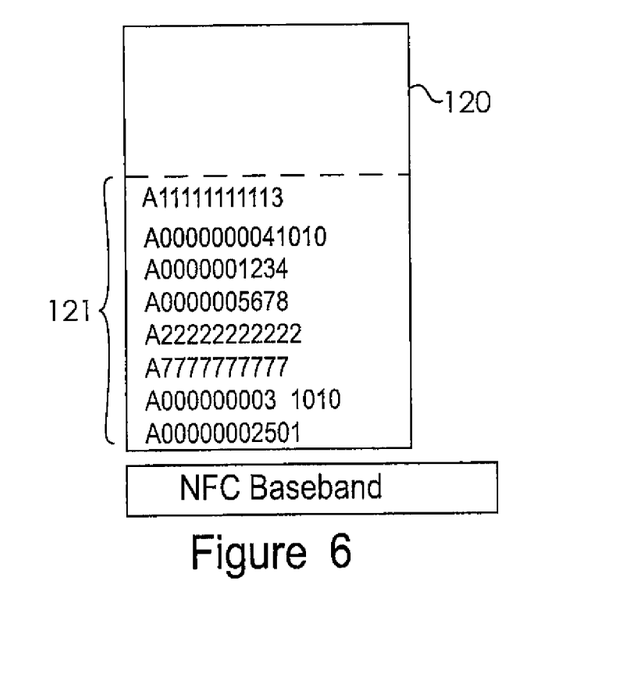

NFC devices 50 are fundamentally capable of transferring information from the reader to the device. Examples of this usage scenario include: sending digital receipts back from the reader to the portable communication device 50 at the end of the transaction. FIG. 6 illustrates a method for achieving this scenario with the addition of another pre-determined AID constant 770 (A7777777777) that would be pre-defined to instruct the reader to push data back to the secure element 120, which reads the NFC reader data into the device 50 via the NFC Baseband.

The foregoing description and drawings merely explain and illustrate the invention and the invention is not limited thereto. While the specification is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:

1. A system for presentation of multiple NFC credentials via an NFC baseband in a portable communication device during a single NFC transaction, the system comprising:
   a secure memory operably connected to the NFC baseband;
   a directory of available credentials stored in the secure memory, wherein the available credentials include a pre-determined multiple-credential start Application ID (AID),
   the directory further containing a plurality of NFC credentials operably associated with the start AID, wherein the portable communication device is configured to wirelessly communicate the start AID and the plurality of NFC credentials to a reader, and wherein the start AID identifies a beginning of a transmission of the plurality of NFC credentials and instructs the reader to process and use each of the NFC credentials to complete the single NFC transaction.

2. The system according to claim 1 wherein the pre-determined multiple-credential start Application ID (AID) is a constant indicating a number of credentials the reader should expect to operably receive during the single NFC transaction.

3. The system according to claim 2 wherein the available credentials further includes a pre-determined multiple-credential end Application ID (AID), the directory further containing the pre-determined multiple-credential end AID after the plurality of NFC credentials, wherein the end AID instructs the reader to stop attempting to operably receive further NFC credentials for the single NFC transaction.

4. The system according to claim 3 wherein the pre-determined multiple-credential end Application ID (AID) is a constant.

5. The system according to claim 1 wherein the pre-determined multiple-credential start Application ID (AID) further includes an integer variable indicative of a number of credentials desired for presentation during a single read of an NFC secure memory registry.

6. A method for presenting multiple NFC credentials via an NFC baseband in a portable communication device during a single NFC transaction, the method comprising:
   connecting a secure memory to the NFC baseband;
   storing a pre-determined multiple-credential start Application ID (AID) in the secure memory;
   storing a first credential in the secure memory in operable association with the pre-determined multiple-credential start Application ID (AID);
   storing a second credential in the secure memory in operable association with the first credential;
   communicating the pre-determined multiple-credential start AID, wherein the start AID identifies a beginning of a transmission of the first and second credentials and instructs a reader to process and use each of the first and second credentials to complete the single NFC transaction; and
   communicating the first and second credentials via the NFC baseband.

7. The method of claim 6 further comprising:
   storing a pre-determined multiple-credential end Application ID (AID) after the second credential, wherein the end AID instructs the reader to stop attempting to operably receive further credentials for the single NFC transaction; and
   halting transmission of credentials via the NFC baseband upon encountering the pre-determined multiple-credentials end Application ID (AID).

8. The method of claim 6 wherein the pre-determined multiple-credential start Application ID (AID) is a constant.

9. The method of claim 8, wherein the constant indicates a number of credentials the reader should expect to operably receive during the single NFC transaction.

10. The method of claim 6, wherein the pre-determined multiple-credential start AID indicates to the reader that the first and second credentials will be sent following the pre-determined multiple-credential start AID during the single NFC transaction.

11. The method of claim 6 wherein the pre-determined multiple-credential start Application ID (AID) further includes an integer variable indicative of a number of credentials desired for presentation during a single read of an NFC secure memory registry.

12. The method of claim 6 wherein a first type of reader device may ignore the pre-determined multiple-credential start Application ID (AID) and a second type of reader device may process the pre-determined multiple-credential start Application ID (AID).

13. An apparatus comprising:
means for connecting a secure memory to an NFC baseband;
means for storing a pre-determined multiple-credential start Application ID (AID) in the secure memory;
means for storing a first credential in the secure memory in operable association with the pre-determined multiple-credential start Application ID (AID);
means for storing a second credential in the secure memory in operable association with the first credential;
means for communicating the pre-determined multiple-credential start AID, wherein the start AID identifies a beginning of a transmission of the first and second credentials and instructs a reader to process and use each of the first and second credentials to complete a single NFC transaction; and
means for communicating the first and second credentials via the NFC baseband.

14. The apparatus according to claim 13 further comprising means for storing a pre-determined multiple-credential end Application ID (AID) after the second credential.

15. The apparatus according to claim 14 further comprising means for halting transmission of credentials via the NFC baseband upon encountering the pre-determined multiple-credentials end Application ID (AID).

16. The apparatus according to claim 13 wherein the pre-determined multiple-credential start Application ID (AID) is a constant indicating to the reader that the first and second credentials will be sent following the pre-determined multiple-credential start AID during the single NFC transaction.

17. The apparatus according to claim 13 wherein the pre-determined multiple-credential start Application ID (AID) is a constant indicating a number of credentials the reader should expect to operably receive during the single NFC transaction.

18. The apparatus according to claim 13 wherein the pre-determined multiple-credential start Application ID (AID) further includes an integer variable indicative of a number of credentials desired for presentation during a single read of an NFC secure memory registry.

19. The apparatus according to claim 13 wherein a first type of reader device may ignore the pre-determined multiple-credential start Application ID (AID).

20. The apparatus according to claim 19 wherein a second type of reader device may process the pre-determined multiple-credential start Application ID (AID).

\* \* \* \* \*